United States Patent [19]

Aström

[11] Patent Number: 4,899,780

[45] Date of Patent: Feb. 13, 1990

[54] DEVICE FOR USE IN CONNECTION WITH TAPPING OFF FLUID FROM OR FILLING FLUID INTO A CONTAINER

[76] Inventor: Erik J. H. Aström, Kärrvägen 26, S-135 55, Tyresö, Sweden

[21] Appl. No.: 340,600

[22] PCT Filed: Jul. 22, 1988

[86] PCT No.: PCT/SE88/00387

§ 371 Date: Mar. 28, 1989

§ 102(e) Date: Mar. 28, 1989

[87] PCT Pub. No.: WO89/00973

PCT Pub. Date: Feb. 9, 1989

[30] Foreign Application Priority Data

Jul. 28, 1987 [SE] Sweden ............................... 8702984

May 13, 1988 [SE] Sweden ............................... 8801810

[51] Int. Cl.⁴ ........................ F16L 55/10; F16K 51/00

[52] U.S. Cl. ...................................... 137/319; 81/3.09; 81/3.42; 81/176.3; 137/321; 220/284; 220/326

[58] Field of Search ....................... 81/3.07, 3.08, 3.09, 81/3.15, 3.29, 3.36, 3.4, 3.42, 176.1, 176.15, 176.2, 176.3, 443, 446; 137/315, 317, 319, 320, 321; 220/284, 323, 324, 326; 292/16, 18, 32, 33, 37, 44, 45, 256.65, 256.69, 257; 138/89

[56] References Cited

U.S. PATENT DOCUMENTS 1,774,091 8/1930 Glawe et al. ........................ 220/326

1,790,761 2/1931 Ortolon ................................. 81/446

2,866,574 12/1958 Roumeliots ......................... 220/326

3,084,828 4/1963 Davies ................................ 220/323

4,214,599 7/1980 Astrom ................................ 137/15

4,339,098 7/1982 Tardot et al. ....................... 220/323

4,351,446 9/1982 Madden .............................. 220/323

4,420,012 12/1983 Astrom .............................. 137/319

FOREIGN PATENT DOCUMENTS 178281 7/1905 Fed. Rep. of Germany ...... 220/326

*Primary Examiner*—George L. Walton

*Attorney, Agent, or Firm*—Fleit, Jacobson, Cohn, Price, Holman & Stern

[57] ABSTRACT

A device for use in connection with tapping off fluid from or filling fluid into a container through a hole (13) closable by a threaded cup-shaped plug (17). The device comprises a housing (10), mountable over the hole (13), and a tool (30) for manually handling the plug (17). The tool comprises a plug holder (34), including two movable gripping jaws (37) having gripping portions (38), insertable into a cavity (18) in the plug (17). The gripping jaws (37) are brought into contact with opposite portions of the side wall (20) of the cavity (18). In order to make it possible to use the tool (30) for handling plugs (17) having cavities (18) of considerable varying diameter, the gripping portions (38) of the gripping jaws (37) are arranged to be moved from rectracted inner end positions to expanded outer end positions through the action of spring forces applied from a spring (45) contained in the plug holder (34).

9 Claims, 3 Drawing Sheets

DEVICE FOR USE IN CONNECTION WITH TAPPING OFF FLUID FROM OR FILLING FLUID INTO A CONTAINER

The present invention relates to a device for use in connection with tapping off fluid from or filling fluid into a container through an internally threaded tapping or filling hole provided in a wall of the container and adapted to be closed by means of an externally threaded generally cup-shaped plug having an outwardly open cavity for receiving an implement serving to rotate the plug.

More particularly, the invention relates to such a device of the kind comprising a bell-like housing which is adapted to be removably mounted with an open end thereof over said hole and which is provided, in its wall, with an opening through which fluid may be fed into or discharged from the housing, and a tool for manually operating the plug from a position outside the housing, said tool comprising a shaft which extends slidably and rotatably through a portion of the housing, located opposite to the open end of the housing, and which is provided with a handle at the end thereof located externally of the housing, while, at its other end, it is provided with a plug holder comprising a body, carried by the tool shaft, and two gripping jaws which are mounted for limited movement in said body and which are provided with gripping portions insertable into the cavity of the plug and movable between retracted inner end positions and expanded outer end positions, the gripping jaws being arranged to be brought into contact under pressure against two opposite portions of the side wall of said cavity by means of said gripping portions.

First of all, devices of said kind are used in connection with tapping off fluid from or filling fluid into drum-shaped containers through bung holes adapted to be closed by means of bungs. In this connection, said devices make it possible to avoid that the personnel carrying out the tapping or filling operation will run the risk of coming into direct contact with the fluid in question.

Through GB-B No. 2 006 723 and GB-B No. 2 055 355 two devices of said kind are previously known. In each of said two known devices, the gripping jaws are formed by axially aligned straight pins which are spring-biased towards retracted inner end positions from which they may be moved to expanded outer end positions by means of a manually operable actuating means formed by a cam member contacting the inner ends of the two pins. In practice, this construction of the plug holder has been found to cause manifest disadvantages. Especially, it has been found that the plug holders of said known devices are not suited to be used for handling other plugs than those where the diameter of the cavity of the plug is only slightly smaller than the distance between the gripping portions of the two gripping jaws when said gripping portions are in their outer end positions. However, in the market, there exist several different types of plugs where the diameter of the cavity varies considerably from one type of plug to another although they are all intended to be utilized for closing internally threaded holes of the same size. The reason for those large variations in the diameter of the cavity, which may amount to about 10 millimeters, is to be found in the fact that the plugs are made from different materials and by different manufacturing methods.

The invention has for its object to provide an improved device of the kind initially specified where the plug holder is well suited for handling plugs having strongly varying diameters.

According to the invention, for the above purpose, there is proposed a device of said kind which is primarily characterized in that the gripping portions of the gripping jaws are arranged to be moved from their inner end positions to their outer end positions through the action of spring forces applied on the gripping jaws from spring means incorporated in the plug holder.

The above construction of the device results in that the gripping jaws may be brought into resilient contact with the side wall of the cavity in the plug instead of into substantially rigid contact with said wall as in the case of the above known devices. This means that the plug holder of the device may be utilized for handling plugs having cavities of strongly varying diameter. The only condition that must be fulfilled to make it possible to use the plug holder for handling a certain plug is that the diameter of the cavity of the plug must be larger than the distance between the gripping portions of the two gripping jaws when these are in their inner end positions but smaller than the distance between the gripping portions of the gripping jaws when these are in their outer end positions.

Another advantage of the device according to the invention is that it completely eliminates the risk of damage on the plug or on the plug holder itself existing in the case of the prior devices and resulting from the fact that the gripping jaws may be brought into contact with the wall of the plug under excessive pressure.

The gripping portions of the gripping jaws may suitably be constantly spring-biased in directions towards their outer end positions by said spring means.

According to a first embodiment of the invention, the gripping jaws may be provided with cam surfaces which are facing in directions towards the front end of the plug holder and by means of which the gripping jaws may cooperate with edge portions of the plug, located at the open end of the cavity, to permit their gripping portions to be inserted into the cavity of the plug while undergoing an automatic resilient compression.

Said cam surfaces of the gripping jaws may preferably extend in mutually converging directions from the gripping portions of the gripping jaws and towards the front end of the plug holder. Moreover, the gripping jaws may suitably be swingably mounted in the body of the plug holder for swivelling motion relatively to said body around mutually parallel swivelling axes extending perpendicular to the longitudinal direction of the tool shaft. Said axes may advantageously be located so as to cause the frictional forces acting on the gripping portions during a retraction of the gripping jaws from the cavity of the plug to give reason to torques tending to swing the gripping jaws in directions towards their outer end positions.

According to a second, alternative embodiment of the invention, the plug holder may however be provided with manually operable actuating means for the gripping jaws by which the gripping portions of said jaws may be forcibly retracted from their outer end positions to their inner end positions to permit an unobstructed insertion of them into the cavity of the plug. In this case, the plug holder may suitably also comprise means for releasably holding the gripping jaws in their inner end positions.

Below the invention will be further described with reference to the accompanying drawings, in which.

Figure 1:
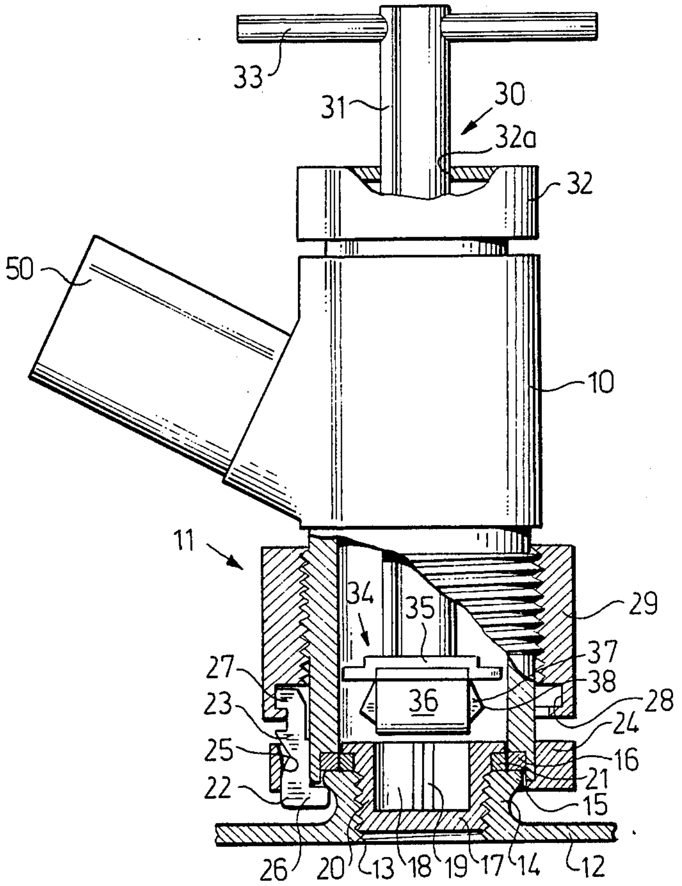
FIG. 1 shows a side elevation, partly in section, of a device according to a first embodiment of the invention, selected by way of example, the device being shown mounted over an internally threaded tapping or filling hole in a container, closed by means of a threaded plug, and with a tool of the device located in a position immediately in front of said plug.
Figure 2:
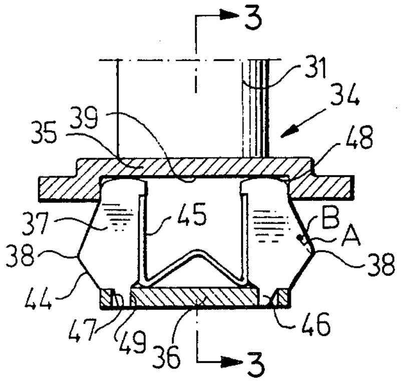
FIG. 2 shows a side elevation, on an enlarged scale and in section, of a plug holder forming part of said tool.
Figure 3:
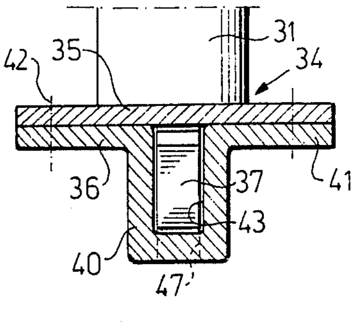
FIG. 3 shows an additional side elevation of said plug holder, in section taken along line III—III in FIG. 2, a spring contained in the plug holder being assumed to be removed.
Figure 4:
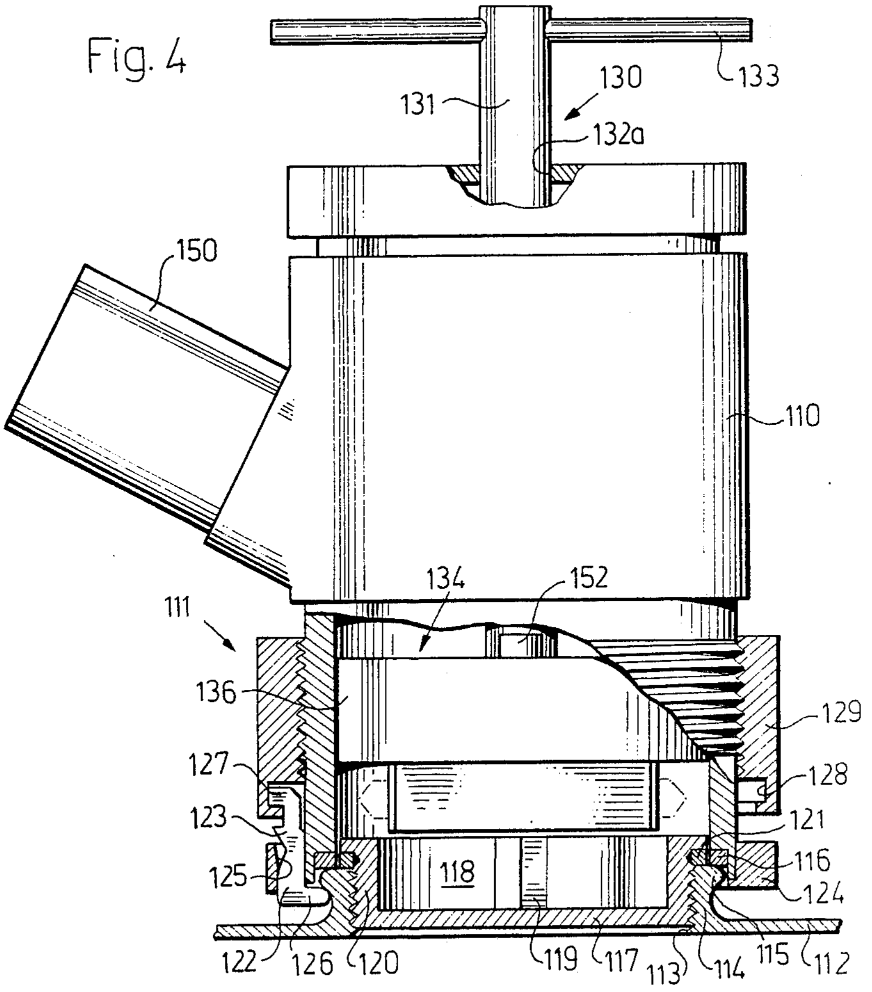
FIG. 4 shows a side elevation, partly in section, of a device according to a second, alternative embodiment of the invention, said device being shown mounted over an internally threaded tapping or filling hole in a container, closed by means of a threaded plug, and with a tool of the device located in a position immediately in front of said plug.

The device shown in FIGS. 1 to 3 comprises a bell-like generally cylindrical housing 10, at its open end provided with a locking device, generally designated 11, by which housing 10 may be locked over a tapping or filling hole 13 in a wall 12 of a container from which fluid may be tapped off and into which fluid may be fed through said tapping and filling hole. Hole 13 is formed by an internally threaded pipe socket 14 projecting from container wall 12 and having, at its outer end, an external peripheral edge flange 15 to which housing 10 may be sealingly connected through the intermediary of a sealing ring 16.

Reference numeral 17 designates an externally threaded generally cup-shaped plug provided with an outwardly open cavity 18 and two opposite wedge-shaped projections 19 which extend a short distance into said cavity from its side wall 20. In FIG. 1, said plug 17 has been shown threaded into pipe socket 14 and sealingly closing hole 13 through the intermediary of a sealing ring 21.

The locking device 11 comprises three jaws 22 located in equally spaced positions along the periphery of housing 10 at the open end thereof. These jaws 22 have elongate shank-like main portions 23 by which the jaws are movably mounted in housing 10 which, at its outer end, is provided with a ring 24, rigidly connected to the housing and having three axially extending grooves 25 which serve as guide passages for the main portions 23 of jaws 22. At their front ends, jaws 22 are provided with bent-in gripping portions 26 by which they may be applied against rear portions of flange 15 of pipe socket 14 to bring housing 10 into sealing contact with said flange through sealing ring 16. Furthermore, at their rear ends, jaws 22 are provided with bent-out heels 27 by which they are held anchored in a circumferentially extending internal groove 28 in an internally threaded sleeve 29 which serves as an operating means for the jaws and is arranged in threaded engagement with an externally threaded portion of housing 10.

Since locking device 11 does not form part of the present invention, any detailed description of said device is not warranted in this connection. It may only be added that jaws 22 are guided relatively to housing 10 in such a manner that, when moved in an axial outward direction from housing 10 by means of sleeve 29, they will initially undergo a rectilinear displacement in their longitudinal directions and, later on, they will be subjected to a simultaneous axial displacement and a radial outward movement of their gripping portions 26, whereby these portions will become fully released from pipe socket 14 and permit removal of the device as a whole. For further information about the function and construction of the locking device, reference is made to DE-Al No. 34 12 455.

In FIG. 1, reference numeral 30 generally designates a tool by which plug 17, when housing 10 is mounted on pipe socket 14, may be manually operated from a position outside housing 10. Said tool 30 comprises a shaft 31 of circular cross-section which is displacably and rotatably mounted in a sealed central through bore 32*a* in a cover 32 mounted on housing 10, at the end thereof remote from locking device 11, to close the housing at said end thereof. At the end thereof located externally of housing 10, shaft 31 is provided with a handle 33, while at its other end, it is provided with a holder for plug 17, generally designated 34.

Said plug holder 34 comprises a body, which is rigidly connected to the shaft and consists of an inner member 35 and an outer member 36, and two flat gripping jaws 37 mounted for limited movement in said body and provided with gripping portions 38 by which the gripping jaws may be brought into frictional engagement with two opposite portions of the side wall 20 of cavity 18 in plug 17.

As may best be seen from FIGS. 2 and 3, the inner member 35 of the body of the plug holder, which is secured directly to shaft 31, consists of a plate having a circular shape in plan view, while, in side elevation according to FIG. 2, it has a bent shape such as to cause it to form a central pocket 39 of rectangular cross-section at its outer side. The outer member 36 of the body of the plug holder 34 consists of a bent band-like member which, in side elevation according to FIG. 3, has a generally U-shaped bent central portion 40 and two flanges 41 which project in lateral directions from the free ends of the two parallel legs of said central portion and which are received in pocket 39 in inner member 35 and secured to member 35 at the connection points illustrated by dash-dotted lines 42 in FIG. 3.

Shaft 31 and the two members 35 and 36 may suitably consist of stainless steel and be welded to each other. Members 35 and 36 may preferably be made by stamping and bending them from a sheet of stainless steel.

Also gripping jaws 37 may advantageously be made by stamping them from a sheet of stainless steel. The shape and the mounting of the gripping jaws in the body of the plug holder 34 may best be seen from FIG. 2. As shown in said Figure, the major portions of the gripping jaws 37 are received in the space 43 formed between the two parallel legs of the U-shaped central portion 40 of member 36. However, at their remote laterally outer ends, the gripping jaws are provided with end portions of generally triangular shape by which they project in lateral directions from said space, the outer tip of said end portion of each gripping jaw forming the previously mentioned gripping portion 38 of said jaw, while the lateral edge of said end portion facing in a direction towards the outer end of the plug holder forms a cam surface 44 intended to facilitate an insertion of the plug holder 34 into the cavity 18 of the plug 17.

Reference numeral 45 designates a leaf spring placed between the two gripping jaws 37 and tending to maintain the gripping jaws in their outer end positions, shown in FIG. 2, in which they rest with portions near their upper ends against surfaces of member 36 located at opposite ends of pocket 39 and acting as stop abutments.

In order to permit a limited swivelling motion of gripping jaws 37 without utilizing any separate pivot pins, at the end thereof remote from shaft 31, each gripping jaw is provided with a wedge-shaped projection 46 received in a through bore 47 in the web of the U-shaped portion 40. Further, at their ends located closest to shaft 31, the gripping jaws 37 are provided with arcuately curved supporting surfaces 48 by which they may slide against the lower side of member 35 facing said ends of the gripping jaws.

The construction of the gripping jaws 37 above described and shown in the drawings results in that, when the plug holder 34 is pushed downwardly against plug 17, the gripping jaws may be swung resiliently in inward directions towards each other around upper and inner edge portions 49 of hole 47 acting as bearing edges. This inward movement of jaws 37 will be caused by the force applied on cam surfaces 44 by the upper and inner edge portion of plug 17.

In FIG. 2, there is shown a dash-dotted arcuate line A illustrating how, during said inward movement of each jaw 37, the gripping portion 38 of said jaw may be swung from its normal rest position to a retracted position, designated B, in which it may rest resiliently against the side wall 20 of cavity 18 in frictional engagement therewith and hold the plug against unintentional removement thereof from plug holder 34.

When plug holder 34 has been inserted into plug 17, the latter may be unscrewn from pipe socket 14 by means of tool 30 and then retracted from said pipe socket to a position in which a free fluid passage is established through housing 10 between hole 13 and an opening in the wall of housing 10 defined by an outwardly projecting connecting pipe 50. A hose or other conduit may be connected to said pipe 50 to convey fluid to or from the container.

Since the swivelling axes of gripping jaws 37 defined by bearing edges 49 are located axially outside and radially inside gripping portions 38, the frictional forces acting on the gripping portions in the case of any tendency of the plug to become released from plug holder 34 will subject gripping jaws 37 to torques tending to swing them towards their outer end positions. Hereby, the device will offer a very high guarantee against any unintentional removal of plug 17 from the plug holder.

The device above described and shown in FIGS. 1 to 3 represents a first embodiment of the invention which, in the first place, is suited to be used in connection with bung holes of comparatively small diameter, for instance about 23 millimeters.

In FIGS. 4 to 10 there is shown a device according to a second, alternative embodiment of the invention which, in the first place, is intended to be utilized in connection with bung holes of comparatively large diameter, for instance about 55 millimeters. However, it should be noted that both embodiments may be modified so as to make it possible to use them in connection with large or small bung holes.

In the embodiment according to FIGS. 4 to 10, elements corresponding to elements 10–38 and 50 of the embodiment according to FIGS. 1 to 3 have been designated by corresponding reference numerals preceeded by the figure "1". Thus, in FIGS. 4 to 10 said elements have been designated 110–138 and 150, respectively.

Similarly to the device according to FIGS. 1 to 3 the device according to FIGS. 4 to 10 comprises a bell-like generally cylindrical housing 110 provided with a locking device, generally designated 111, by which housing 110 may be locked over a tapping or filling hole 113 provided in a container wall 112 and formed by an internally threaded pipe socket 114 which projects from container wall 112 and is provided with a peripheral edge flange 115 to which housing 110 may be sealingly connected through the intermediary of a sealing ring 116.

Reference numeral 117 designates an externally threaded, generally cup-shaped plug which is provided with an outwardly open cavity 118 and two opposite wedge-shaped projections 119 extending into said cavity from the side wall 120 thereof. Said plug 117 may close hole 113 sealingly through the intermediary of a sealing ring 121.

Locking device 111 comprises three jaws 122 located in equally spaced positions along the periphery of housing 110 and having elongate main portions 123 by which they are movably mounted in housing 110 which is provided with a ring 124, rigidly connected to said housing and having three axially extending grooves 125 serving as guide passages for the main portions 123 of jaws 122. At their front ends, jaws 122 are provided with bent-in gripping portions 126, by which they may be applied against rear portions of flange 115 of pipe socket 114. Moreover, at their rear ends, jaws 122 are provided with bent-out heels 127 by which they are held anchored in a circumferentially extending internal groove 128 in an internally threaded sleeve 129 which is arranged in threaded engagement with an externally threaded portion of housing 110.

Reference numeral 130 generally designates a tool comprising a shaft 131 journalled in an opening **132*a* in a cover 132. At its end located outside housing 110, shaft 131 is provided with a handle 133, while at its other end, it is provided with a holder for plug 117, generally designated 134**.

This plug holder 134 comprises a circular disk 135, rigidly mounted on shaft 131, and a body 136, mounted for limited rotary movement on said disk, and two gripping jaws 137, which are mounted for limited displacement in said body and which are provided with gripping portions 138 by which said gripping jaws may be brought into contact under pressure against two opposite portions of the side wall 120 of the cavity 118 provided in plug 17.

Body 136, which may be formed for instance by a plastic moulding, consists of an upper cylindrical portion 136' and a lower generally rectangular transverse portion 136" and is provided with a series of recesses 139, 140, 141 and 142 following one after the other in a direction from the top end of said body and towards the bottom end thereof and terminating into each other.

The first, or upper recess 139 has a low cylindrical shape and serves to receive disk 135 which is rigidly mounted on tool shaft 131, rotatably therein. Also the next following second recess 140 has a low cylindrical shape. However, it has a slightly smaller diameter than recess 139. The third recess 141 has, both in plan view and in cross-section, a generally rectangular shape and it extends transversally to body 136 in a direction parallel to body portion 136". Also the following fourth recess 142 has a generally rectangular shape. However, it has a slightly shorter length and considerably smaller width than recess 141. At its both ends, recess 142 terminates into rectangular openings 143 in the short sides of body portion 136".

The two lower recesses 141 and 142 serve to receive the two gripping jaws 137 displacably therein. Moreover, recess 141 also serves to receive two springs 144 by which gripping jaws 137 may be spring-biased in a manner shown in FIG. 5. Recess 140 receives a circular cover disk 145 serving to hold gripping jaws 137 and springs 144 in positions below the same.

Gripping jaws 137 are made by stamping and bending from a thin sheet of stainless steel. As may be seen from FIGS. 6 and 7, each gripping jaw 137 has the shape of an angularly bent member comprising an upper horizontal leg 146 and a downwardly bent vertical leg 147, at its one end having an end portion 148 of reduced height forming the previously mentioned gripping portion 138. At the opposite end of gripping jaw 137, there is provided a vertical lug 149 extending in an upward direction from the horizontal leg 146 and having a width corresponding to twice the width of leg 146.

Figure 5:
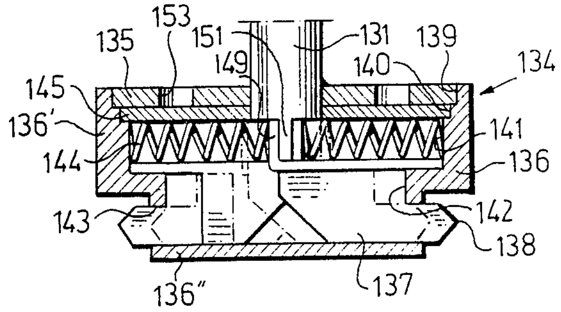
FIG. 5 shows a side elevation, in section, of a plug holder forming part of said tool.
Figure 6:
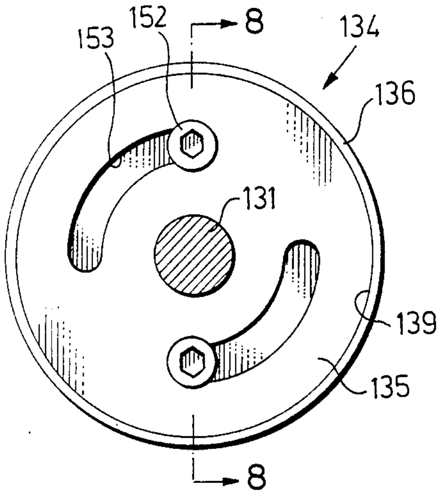
FIG. 6 shows a top plan view of said plug holder.
Figure 7:
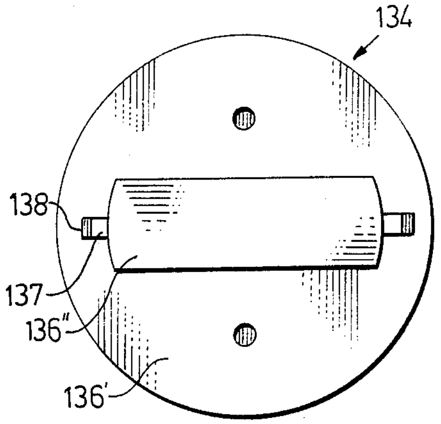
FIG. 7 shows a bottom plan view of said plug holder.
Figure 8:
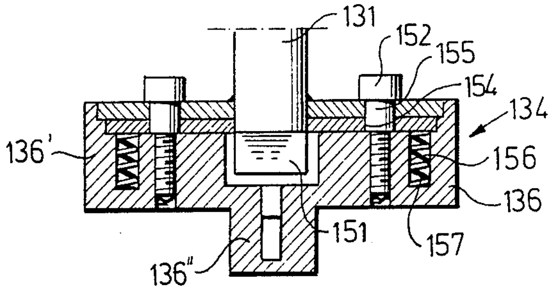
FIG. 8 shows an additional side elevation of the plug holder in section taken along line VIII—VIII in FIG. 6, two gripping jaws of the plug holder and two springs serving to bias said jaws being however omitted for the purpose of clarification.
Figure 10:
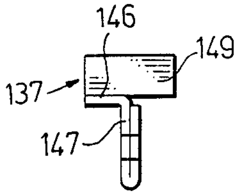
FIG. 10 shows an end view of said gripping jaw, showing it viewed from the right according to FIG. 9.
Figure 9:
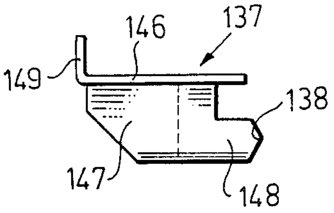
FIG. 9 shows a side elevation of one of said gripping jaws.

As may be seen from FIG. 5, the gripping jaws 137 are placed within body 136 in such a manner that their horizontal legs 146 will rest displacably on the bottom surface of recess 141, while their vertical legs 147 are received in partially overlapping side-by-side positions within recess 142. End portions 148, which have an increased thickness obtained by double-folding the sheet material in the gripping jaws, are displacably received in openings 143.

Springs 144 are placed each between one end wall of recess 141 and the rear side of lug 149 of one gripping jaw. Hereby, springs 144 tend to maintain the gripping jaws 137 in their outer end positions, shown in full lines in FIG. 5, and in which gripping portions 138 are located on a maximum distance from each other. In order to permit gripping jaws 137 to be forcibly moved from said positions to their inner end positions, shown in dash-dotted lines, and in which the gripping portions 138 are retracted into openings 143, an end portion of tool shaft 131, projecting through a central opening in disk 145, is provided with an operating means for the two gripping jaws formed by a flat transversal tongue 151 against which the gripping jaws rest with the adjacent sides of lugs 149.

Said tongue 151 may be rotated from the position shown in FIG. 5 to a position perpendicular to the first-mentioned position by rotating tool shaft 131 through an angle of 90° relatively to the body 136 of the plug holder. In order to permit such a relative rotary movement between the tool shaft and body 136, disk 135 is connected to the body by means of two screws 152 threaded into said body and extending each through one arc-circular slot-shaped opening 153 in disk 135 (see FIGS. 6 and 8). These two screws 152 extend each through one circular bore 154 in cover disk 145 and, at their upper ends, they are provided with spacing sleeves 155 having a length slightly exceeding the total thickness of the two disks 135 and 145. Hereby, said two disks are prevented from being brought into permanent locking engagement with each other as a consequence of any excessive tightening of screws 152. In order to obtain a limited frictional engagement of predetermined magnitude between the two disks 135 and 145 and make sure that these two disks may be releasably held in stationary positions relatively to each other and prevented from carrying out any unintentional relative rotary movement under the action of forces applied on tongue 151 from springs 144 through lugs 149, the lower disk 145 is spring-biased into contact under certain pressure against the upper disk 135 by means of two springs 157 placed each in one bore 156 in body 136.

As a result of the construction of plug holder 134 above described, gripping jaws 137 may be inserted into plug 117 with gripping portions 138 located in their retracted inner end positions. The gripping portions may then be expanded into resilient contact under pressure against the side wall of cavity 118 under the action of springs 144 by rotating shaft 131 in a counter-clockwise direction relatively to the body 136 of the plug holder.

Below the manner of operation of the device will be described in further detail. When the device has been placed over hole 113, formed by pipe socket 114, and locked to flange 115 by means of locking device 111, plug holder 134 is pushed downwardly against plug 117 from the position shown in FIG. 4 by means of handle 133. The lower portion 136" of the body of the plug holder is hereby inserted into cavity 118. Plug holder 134 is then rotated in a counter-clockwise direction by means of handle 133. Hereby, portion 136" is brought into contact with the two wedge-shaped projections 119. When handle 133 is then further rotated in a counter-clockwise direction, the gripping jaws are released by tongue 151 and brought into contact with the side wall of cavity 118. When the handle has been rotated through an angle of 90° relatively to the body of the plug holder, continued further rotation of the handle will be transmitted from said body to plug 117 which will then be unscrewn from pipe socket 114. Plug 117, which will remain held on the plug holder by gripping jaws 137, may then be retracted from the pipe socket to a position in which it permits free passage of fluid through housing 110 between hole 113 and an opening in the wall of housing 110 formed by an outwardly projecting connecting pipe 150.

By means of tool 130, plug 117 may then again be threaded into pipe socket 114 to close hole 113, when so desired. When the plug has been tightened, handle 133 may be further rotated in a clockwise direction to cause the gripping jaws 137 to become retracted to their inner end positions, whereupon the plug holder may be removed from the plug.

An important common feature of both embodiments is that the gripping jaws are arranged to be brought into resilient contact with the side wall of the cavity in the plug instead of into rigid contact with said wall. Hereby, the plug holder may be utilized for safely handling plugs having cavities of considerably varying diameter.

The invention is not restricted to the embodiments above described and shown in the drawings. Instead, many other embodiments are feasible within the scope of the invention.

What is claimed is:

1. A device for use in connection with tapping off fluid from or filling fluid into a container through an internally threaded tapping- or filling hole (13; 113) provided in a wall (12; 112) of said container and adapted to be closed by means of an externally threaded generally cup-shaped plug (17; 117) having an outwardly open cavity (18; 118) for receiving an implement serving to rotate the plug (17; 117), said device comprising a bell-like housing (10; 110) which is adapted to be removably mounted with an open end thereof over said hole (13; 113) and which is provided, in its wall, with an opening (50; 150) through which fluid may be fed into or discharged from the housing, and a tool (30; 130) for manually operating the plug (17; 117) from a position outside the housing (10; 110), said tool (30; 130) comprising a shaft (31; 131) which extends slidably and rotatably through a portion (32; 132) of the housing, located opposite to the open end of the housing, and which is provided with a handle (33; 133) at the end thereof located externally of the housing (10; 110), while, at the other end, it is provided with a plug holder (34; 134) comprising a body (35, 36; 136), carried by the tool shaft (31; 131), and two gripping jaws (37; 137) which are mounted for limited movement in said body and which are provided with gripping portions (38; 138) insertable into the cavity of the plug and movable between retracted inner end positions and expanded outer positions, the gripping jaws (37; 137) being arranged to be brought into contact under pressure against two opposite portions of the side wall (20; 120) of said cavity (18; 118) by means of said gripping portions, characterized in that the gripping portions (38; 138) of the gripping jaws (37; 137) are arranged to be moved from their inner end positions to their outer end positions through the action of spring forces applied on the gripping jaws (37; 137) from spring means (45; 144) incorporated in the plug holder (34; 134), the gripping portions (38; 138) of the gripping jaws (37; 137) being constantly spring-biased in directions towards their outer end positions by said spring means (45; 144), the gripping jaws being mounted for movement to retract the gripping jaws back into the body of the plug holder to allow the plug holder to be inserted into the cavity of the plug with the gripping jaws retracted, and retraction means for retracting the gripping jaws into the plug holder, whereupon after insertion of the plug holder into the cavity plug, the gripping jaws under the influence of the spring means are projected to their outer end positions into contact with opposite side wall portions of the said cavity for removal of the plug.

2. A device according to claim 1, characterized in that the gripping jaws (37) are provided with cam surfaces (44) which are facing in directions towards the front end of the plug holder (34) and by means of which the gripping jaws are arranged to cooperate with edge portions of the plug (17), located at the open end of the cavity (18), to permit their gripping portions (38) to be inserted into the cavity (18) of the plug (17) while undergoing an automatic resilient compression.

3. A device according to claim 2, characterized in that said cam surfaces (44) extend in mutually converging directions from the gripping portions (38) of the gripping jaws (37) and towards the front end of the plug holder (34).

4. A device according to claim 3, characterized in that the gripping jaws (37) are swingably mounted in the body (35, 36) of the plug holder (34) for swivelling motion relatively to said body around mutually parallel swivelling axes (49) extending perpendicular to the longitudinal direction of the tool shaft (31).

5. A device according to claim 4, characterized in that the swivelling axes (49) of the gripping jaws (37) are located so as to cause the frictional forces acting on the gripping portions (38) during a retraction of the gripping jaws (37) from the cavity (18) of the plug (17) to give reason to torques tending to swing the gripping jaws (37) in directions towards their outer end positions.

6. A device according to claim 1, characterized in that the plug holder (134) is provided with manually operable actuating means (151) for the gripping jaws (137) by which the gripping portions (138) of said jaws may be forcibly retracted from their outer end positions to their inner end positions to permit an unobstructed insertion of them into the cavity (118) of the plug (117).

7. A device according to claim 6 characterized in that the plug holder (134) also comprises means (145, 157) for releasably holding the gripping jaws (137) in their inner end positions.

8. A device for use in connection with tapping off fluid from or filling fluid into a container through an internally threaded tapping or filling hole (13) provided in a wall (12) of said container and adapted to be closed by means of an externally threaded generally cup-shaped plug (17) having an outwardly open cavity (18) for receiving an implement serving to rotate the plug (17), said device comprising a bell-like housing (10) which is adapted to be removably mounted with an open end thereof over said hole (13) and which is provided, in its wall, with an opening (50) through which fluid may be fed into or discharged from the housing, and a tool (30) for manually operating the plug (17) from a position outside the housing (10), said tool (30) comprising a shaft (31) which extends slidably and rotatably through a portion (32) of the housing, located opposite to the open end of the housing, and which is provided with a handle (33) at the end thereof located externally of the housing (10), while, at its other end, it is provided with a plug holder (34) comprising a body (35, 36) carried by the tool shaft (31), and two gripping jaws (37) which are mounted for limited movement in said body and which are provided with gripping portions (38) insertable into the cavity of the plug and movable between retracted inner end positions and expanded outer end positions, the gripping jaws (37) being arranged to be brought into contact under pressure against two opposite portions of the side wall (20) of said cavity (18) by means of said gripping portions, characterized in that the gripping portions (38) of the gripping jaws (37) are arranged to be moved from their inner end positions to their outer end positions through the action of spring forces applied on the gripping jaws (37) from spring means (45) incorporated in the plug holder (34) and constantly spring-biasing portions (38) of the gripping jaws (37) towards their outer end positions, the gripping jaws (37) being provided with cam surfaces (44) which are facing in directions towards the front end of the plug holder (34) and by means of which the gripping jaws are arranged to cooperate with edge portions of the plug (17), located at the open end of the cavity (18), to permit their gripping portions (38) to be inserted into the cavity (18) of the plug (17) while undergoing an automatic resilient compression.

9. A device for use in connection with tapping off fluid from or filling fluid into a container through an internally threaded tapping or filling hole (113) provided in a wall (112) of said container and adapted to be closed by means of an externally threaded generally cup-shaped plug (117) having an outwardly open cavity (118) for receiving an implement serving to rotate the plug (117), said device comprising a bell-like housing (110) which is adapted to be removably mounted with an open end thereof over said hole (113) and which is provided, in its wall, with an opening (150) through which fluid may be fed into or discharged from the housing, and a tool (130) for manually operating the plug (117) from a position outside the housing (110), said tool (130) comprising a shaft (131) which extends slidably and rotatably through a portion (132) of the housing located opposite to the open end of the housing, and which is provided with a handle (133) at the end thereof located externally of the housing (110), while, at its other end, it is provided with a plug holder (134) comprising a body (136) carried by the tool shaft (131), and two gripping jaws (137) which are mounted for limited movement in said body and which are provided with gripping portions (138) insertable into the cavity of the plug and movable between retracted inner end positions and expanded outer end positions, the gripping jaws (137) being arranged to be brought into contact under pressure against two opposite portions of the side wall (120) of said cavity (118) by means of said gripping positions, characterized in that the gripping portions (138) of the gripping jaws (137) are arranged to be moved from their inner end positions to their outer end positions through the action of spring forces applied on the gripping jaws (137) from spring means (144) incorporated in the plug holder (134) and constantly spring-biasing portions (138) of the gripping jaws (137) towards their outer end positions (144), the plug holder (134) being provided with manually operable actuating means (151) for the gripping jaws (137) by which the gripping portions (138) of said jaws may be forcibly retracted from the outer end portions to their inner end positions to permit an unobstructed insertion of them into the cavity (118) of the plug (117).

* * * * *